United States Patent
Abeygunawardana et al.

(10) Patent No.: US 12,458,174 B2
(45) Date of Patent: Nov. 4, 2025

(54) MIXING BOWL POSITIONING IMPROVEMENT FOR A STAND MIXER APPLIANCE

(71) Applicant: Haier US Appliance Solutions, Inc., Wilmington, DE (US)

(72) Inventors: Danister Abeygunawardana, Jeffersonville, IN (US); Tomas Garces, Louisville, KY (US); Eric Matthew Lewis, Louisville, KY (US); Matthew R. Hunter, Louisville, KY (US); Mason Hawkins, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 594 days.

(21) Appl. No.: 17/885,645

(22) Filed: Aug. 11, 2022

(65) Prior Publication Data
US 2024/0049915 A1    Feb. 15, 2024

(51) Int. Cl.
*A47J 43/00* (2006.01)
*A47J 43/044* (2006.01)

(52) U.S. Cl.
CPC .... *A47J 43/044* (2013.01); *A47J 2043/04463* (2013.01)

(58) Field of Classification Search
CPC ............. A47J 43/044; A47J 2043/04463
See application file for complete search history.

(56) References Cited

U.S. PATENT DOCUMENTS

| | | | | |
|---|---|---|---|---|
| 2,168,429 A | * | 8/1939 | Myers ............... | A47J 43/044 366/206 |
| 2,689,114 A | * | 9/1954 | Hammond, Jr. ...... | A47J 43/044 310/68 B |
| 4,518,263 A | * | 5/1985 | Brym ................ | B01F 35/60 366/601 |
| 9,993,016 B1 | * | 6/2018 | Dyer ................. | A23G 9/224 |
| 10,098,505 B2 | | 10/2018 | Roberts et al. | |
| 2007/0195641 A1 | * | 8/2007 | Schnipke .......... | B01F 27/805 366/206 |
| 2019/0191718 A1 | | 6/2019 | Kesig et al. | |
| 2023/0210309 A1 | * | 7/2023 | Turner ............. | A47J 43/0711 366/207 |

FOREIGN PATENT DOCUMENTS

| | | |
|---|---|---|
| EP | 3108781 B1 | 10/2018 |
| WO | WO2008/132429 A1 | 11/2008 |

* cited by examiner

*Primary Examiner* — Anshu Bhatia
(74) *Attorney, Agent, or Firm* — Dority & Manning, P.A.

(57) ABSTRACT

A stand mixer is provided. The stand mixer may include a support frame, a bowl arm assembly, and a damper assembly. The bowl arm assembly may be mounted to the support frame and may be moveable a raised position and a lowered position. The damper assembly may be mounted to the support frame and may be positioned for engaging the bowl arm assembly as it moves towards the lower position. The stand mixer may also include a bracket attached to the bowl arm assembly.

20 Claims, 6 Drawing Sheets

MIXING BOWL POSITIONING IMPROVEMENT FOR A STAND MIXER APPLIANCE

FIELD OF THE INVENTION

The present subject matter relates generally to household appliances, and more particularly to stand mixers.

BACKGROUND OF THE INVENTION

Stand mixers generally include a stand upon which a mixing bowl is placed and at least one mixing device that rotates within the bowl. The stand mixer generally includes a head, a base having a support column, and a horizontal base member. The support column generally connects the head and the horizontal base member. In some stand mixers, the mixing device is a removable attachment that attaches to a shaft, the shaft attached to the head of the stand mixer. To remove the mixing bowl or change the removable attachment, generally, a distance between the head and the mixing bowl needs to be increased. In order to have effective mixing, the distance between the head and the bowl is generally decreased. In order to adjust the distance between the head and the bowl, some stand mixers may have a bowl arm assembly to move the bowl in a vertical direction along the support column between the head and the horizontal base member. The bowl arm assembly may be moveable along the support column. The mixing bowl may attach to the bowl arm assembly.

Challenges exist in the movement of the bowl arm assembly. The bowl arm assembly may become heavy (e.g., when the mixing bowl is attached), which may make movement of the bowl arm assembly downward for unloading more difficult to control. Such difficulty may be increased when the mixing bowl is filled with ingredients to be mixed (such as a dough or batter), as the force with which the bowl arm assembly and filled mixing bowl move along the column may be increased with the additional mass of the filled mixing bowl.

Accordingly, a bowl lowering mechanism that decreases the difficulty of control during lowering the bowl arm assembly would be useful. Additionally, a bowl lowering mechanism that increases the safety of the stand mixer would be desirable.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a stand mixer is provided. The stand mixer may define a vertical direction, a lateral direction, and a transverse direction. The stand mixer may include a support frame, a bowl arm assembly, and a damper assembly. The bowl arm assembly may be mounted to the support frame and may be moveable a raised position and a lowered position. The damper assembly may be mounted to the support frame and may be positioned for engaging the bowl arm assembly as it moves towards the lower position.

In another exemplary aspect of the present disclosure, a stand mixer is provided. The stand mixer may define a vertical direction, a lateral direction, and a transverse direction. The stand mixer may include a support frame, a bowl arm assembly, a bracket, and a damper assembly. The bowl arm assembly may be mounted to the support frame and may be moveable a raised position and a lowered position. The bracket may be attached to the bowl arm assembly. The damper assembly may be mounted to the support frame and may be positioned for engaging the bowl arm assembly as it moves towards the lower position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same or similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The present invention advantageously provides a stand mixer appliance that may provide additional safety for users when lowering a bowl of the stand mixer appliance. The present invention may significantly decrease the speed of impact when lowering the mixing bowl into an unloading or lowered position of the stand mixer appliance. Embodiments described herein may include mechanisms to lower the bowl arm assembly at a slow speed into the lowered position, reducing or eliminating a risk of pinching or crushing articles, including a user's fingers or hands, in between a stand base of the stand mixer appliance and the bowl of the appliance. Additionally, the speed of the mixer moving slowly may decrease jostling of contents of a bowl, e.g., reducing the likelihood of liquids splashing out of the bowl.

Figure 1:
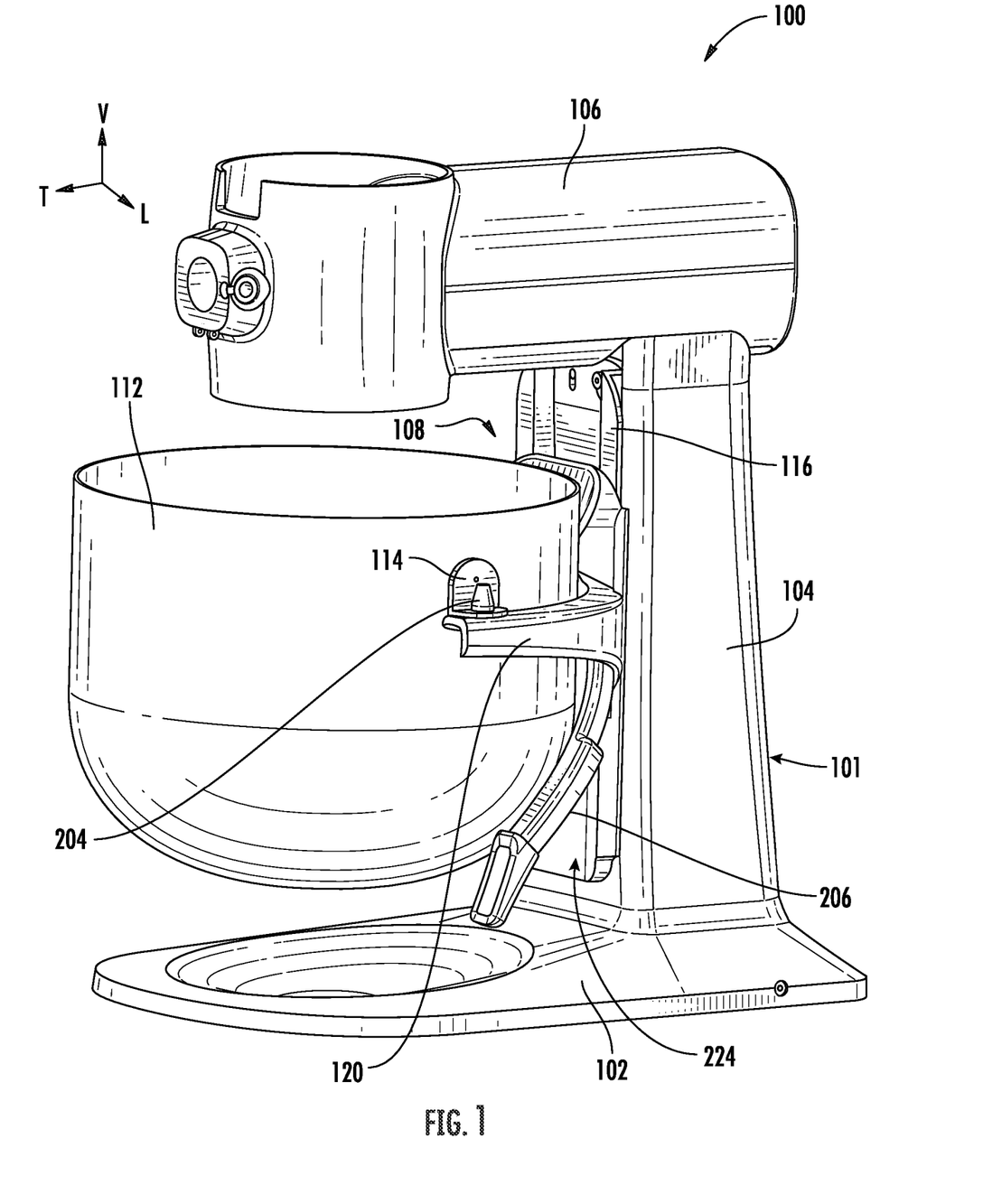
FIG. 1 provides a perspective view of a stand mixer according to exemplary embodiments of the present disclosure.
Figure 2:
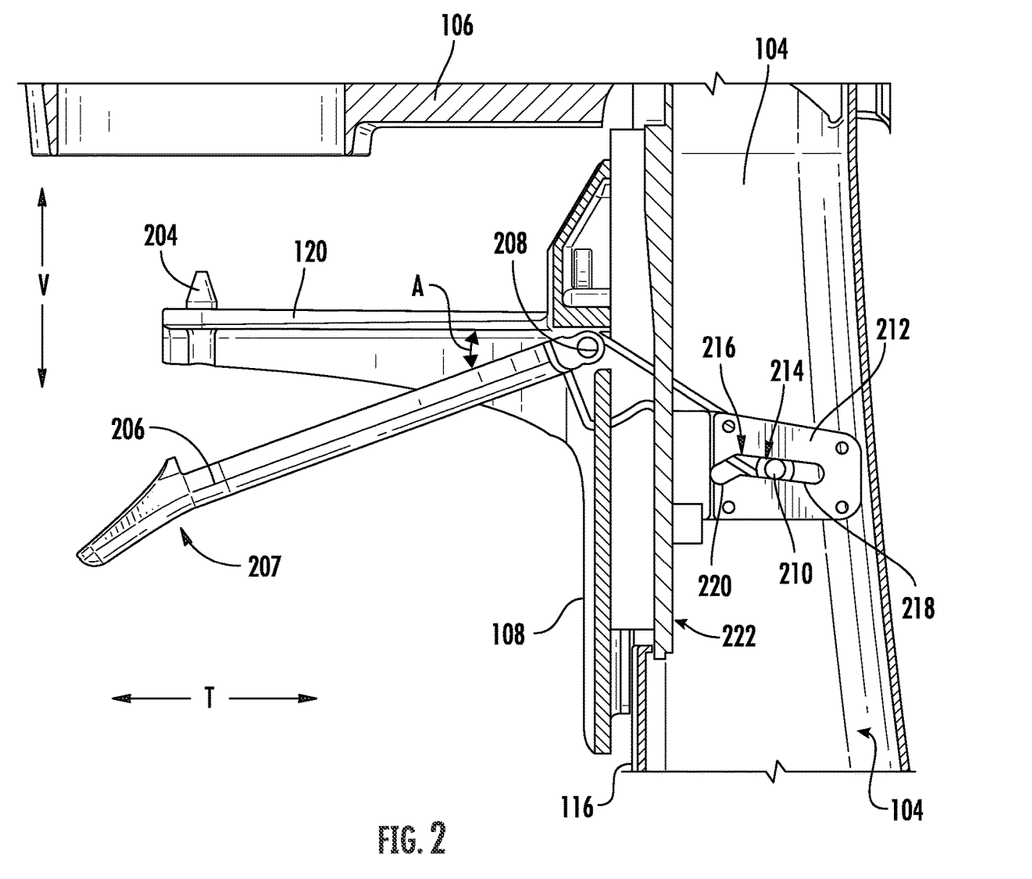
FIG. 2 provides a side, cross sectional view of the exemplary stand mixer appliance of FIG. 1.
Figure 3:
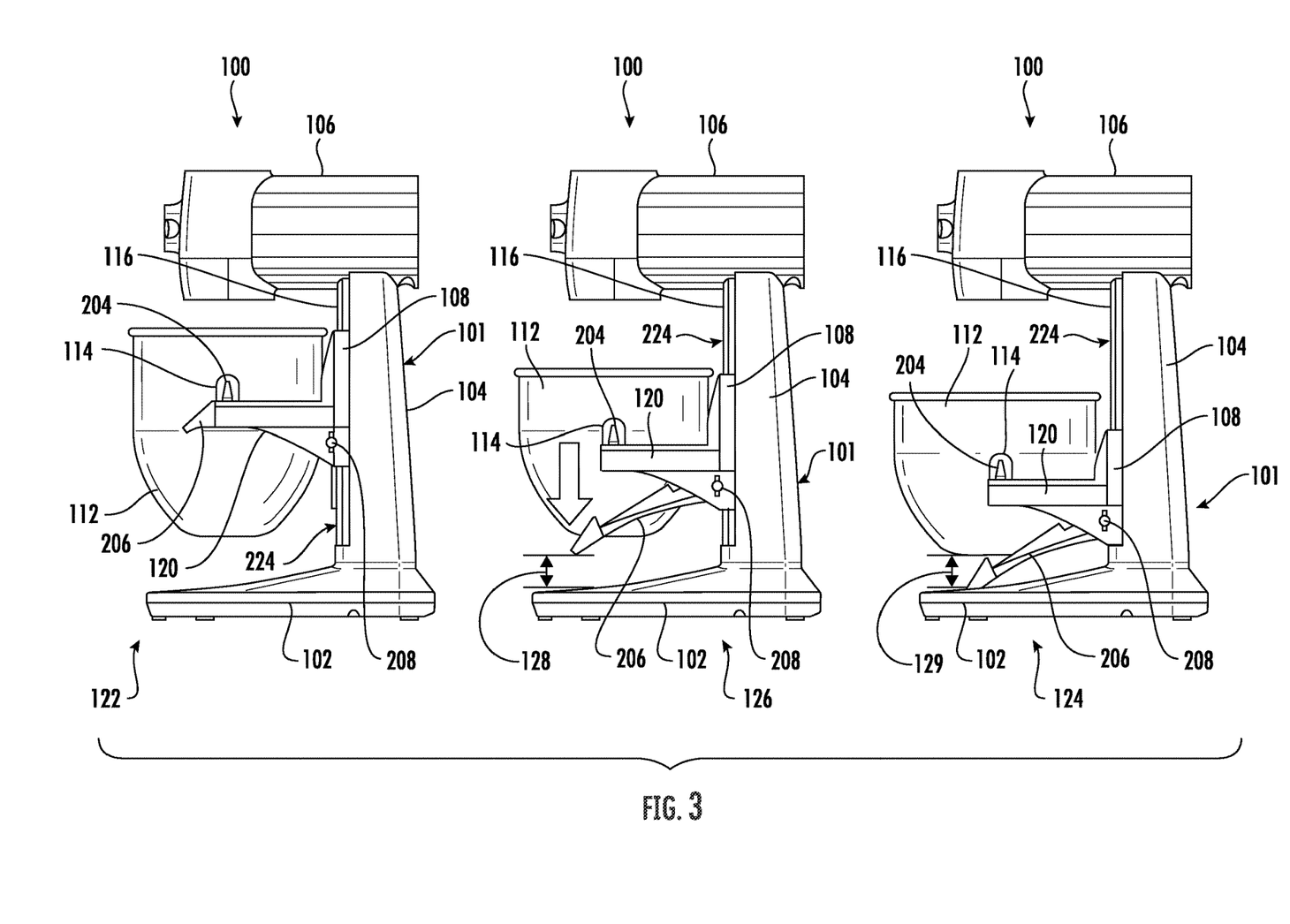
FIG. 3 provides a side view of the exemplary stand mixer appliance of FIG. 1 in three positions: a raised position, a mid-movement position, and a lowered position.

FIG. 1 provides a perspective view of a stand mixer 100 according to an example embodiment of the present subject matter. It will be understood that stand mixer 100 is provided by way of example only and that the present subject matter may be used in or with any suitable stand mixer in alternative example embodiments. FIG. 2 provides a side, cross-sectional view of stand mixer 100. FIG. 3 provides a side view of stand mixer 100 in a raised position 122, a mid-movement position 126, and a lowered position 124. Stand mixer 100 defines a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a support frame 101 and a bowl arm assembly 108. Support frame 101 may support components of stand mixer 100, as will be described herein. Bowl arm assembly 108 may be slidably mounted to support frame 101 and may be moveable between the raised position 122 and the lowered position 124. Bowl arm assembly 108 may be configured for supporting a mixing bowl 112, as will be described in more detail below.

As shown in FIGS. 1 and 2, support frame 101 may include a base member 102 and a support column 104. Support column 104 may support a mixer head 106, which may be mounted proximate to a top of support frame 101. Head 106 may house a motor, a gearbox, and/or a drivetrain apparatus (not shown) of stand mixer 100. For example, as shown in FIG. 1, a mixer head 106 may be mounted to support column 104, which is mounted to base 102. Thus, support column 104 may extend between and connect base 102 and head 106, e.g., along the vertical direction V. Head 106 may extend outwardly above the base 102 in the transverse direction T. Further, mixing head 106 may be mounted proximate to a top of support frame 101 (e.g., head 106 may be cantilevered relative to support frame 101).

Support frame 101 further includes a column rail 116. Column rail 116 may be mounted to support column 104. Column rail 116 includes an inner surface 222 (FIG. 2) and an outer surface 224 facing opposite the inner surface 222. A bowl arm assembly 108 may be slidably mounted on the support column 104 of support frame 101. In some embodiments, bowl arm assembly 108 is slidably connected to column rail 116 and moveable along column rail 116 in the vertical direction V between the raised position 122 and the lowered position 124.

Components of bowl arm assembly 108, including at least one bowl support arm 120 and at least one lift arm 206, may extend outwardly above the base 102, e.g., in the transverse direction T, and may hold a mixing bowl 112 above, vertically, base 102. Mixing bowl 112 may be removably coupled to bowl arm assembly 108. Further, mixing bowl 112 may be moveable with bowl arm assembly 108 between the raised position 122 and the lowered position 124, as shown in FIG. 2.

A set of flanges 114 attached to mixing bowl 112 may aid in coupling of mixing bowl 112. For example, flanges 114 may be on opposite sides of the mixing bowl 112 with respect to the circumference of the mixing bowl 112.

Bowl arm assembly 108 may include a bowl support arm 120 configured for receiving mixing bowl 112. Bowl support arm 120 may be positioned adjacent the mixing head 106 when the bowl arm assembly 108 is in the raised position 122. Bowl support arm 120 may be a component of bowl arm assembly 108 that extends outwardly above base 102. As shown, bowl support arm 120 may include a mounting spike 204. Bowl support arm 120 may hold mixing bowl 112 via mounting spike 204, which removably couples to mixing bowl 112 (e.g., by coupling to flanges 114). For instance, each mounting spike 204 on bowl support arm 120 may be received within a respective flange 114 on mixing bowl 112. In some embodiments, bowl arm assembly 108 may include two bowl support arms 120, each with a respective mounting spike 204. In some embodiments, other attachment mechanisms may be used, including an alternative arrangement with spikes 204 attached to mixing bowl 112 and flanges attached to bowl arm assembly 108, as would be understood.

With reference to FIGS. 1 through 3, a bowl arm assembly 108 includes rotating lift arm 206. A particular embodiment and operation of feature bowl arm assembly 108 will now be described. However, using the teaching disclosed herein, one of ordinary skill in the art will understand that other constructions and methods of operation may be used in still other embodiments. Lift arm 206 may be pivotably attached or rotatably coupled to bowl support arm 120 via a hinge pin 208. There may be at least two lift arms 206. Thus, mixing bowl 112 may be disposed between lift arms 206, e.g., along the lateral direction L. Each lift arm 206 may be positioned on a respective side of mixing bowl 112, such that both a left-handed user and a right-handed user may comfortably operate lift arms 206. Lift arm 206 may be configured to pivot to initiate movement of bowl arm assembly 108 from raised position 122 to lowered position 124. Bowl arm assembly 108 may be configured to slide up and down on column rails 116 but may be constrained otherwise.

In some embodiments, bowl arm assembly 108 may be attached to a ramp pin 210 that is located within a slot 214 defined by a ramp block 212. Ramp block 212 is at least partially located within support frame 101 and may be fixed to support column 104. In some embodiments, ramp slot 214 includes a detent 220, a bottom position 218, and a highest position 216 that declines to an opposite end of slot 214.

As shown in FIG. 3, in the lowered position 124, lift arm 206 is angled downwards. In raised position 122, lift arm 206 is angled horizontal, parallel with bowl support arm 120. Generally, lift arm 206 is moveable about hinge pin 208 at angle A relative to bowl support arm 120, as shown in FIG. 2. To lower the mixing bowl 112, the user rotates the lift arm 206 downwards about hinge pin 208. As shown, this causes ramp pin 210 to overcome ramp detent 220. Overcoming ramp detent 220 allows the ramp pin 210 to freely slide from the highest position 216 to the bottom position 218, lowering bowl arm assembly 108 toward the lowered position 124.

To raise the bowl arm assembly 108, the lift arms 206 are pulled upwards, lift arms 206 engaging with the bowl support arm 120 to lift the bowl arm assembly 108 upwards. Lift arm 206 is rotated upwards about hinge pin 208 to begin raising bowl arm assembly 108 from lowered position 124 into raised position 122. When the lift arm 206 is rotated upwards around the hinge pin 208, the ramp pin 210 is pulled forward along the ramp block 212. Since slot 214 does not follow an arc that is concentric with the hinge pin 208, hinge pin 208 must move upwards, pushing the bowl support arm 120 up along with it. Once the lift arm 206 is horizontal, the ramp pin 210 falls into detent 220. Detent 220 may prevent unintentional rotation of the lift arm 206. A locking spring (not shown) may bias the ramp pin 210 down into detent 220 and may serve to assist the user in lifting the bowl arm assembly 108.

Operation of stand mixer 100 is described below. In the operation of stand mixer 100, a user may load food items into mixing bowl 112. The food items may be ingredients such as flour, water, milk, etc. These items are provided for example purposes only and one skilled in the art would appreciate that there are many more types of food items that may be placed in mixing bowl 112 of stand mixer 100. After loading the food items into mixing bowl 112, bowl arm assembly 108 is placed in the raised position 122 and a user turns on a motor to begin the process of mixing, kneading, beating, etc. The motor rotates an attachment (not shown) attached to stand mixer 100 to complete each of these processes. The processes may be conducted with a respective attachment such as a mixer blade for mixing, a dough hook for kneading, and a balloon whisk for beating.

As shown in FIG. 3, mixing bowl 112 rests above base member 102 in the raised position 122 and the lowered position 124. In some embodiments, there is a lowered distance 129 between the base member 102 and mixing bowl 112 in the lowered position 124. In some embodiments, not shown, the mixing bowl 112 contacts the base member 102 in the lowered position 124. In some embodiments, and as shown in FIG. 3 in lowered position 124, lift arm 206 contacts base member 102 in lowered position 124.

Figure 4:
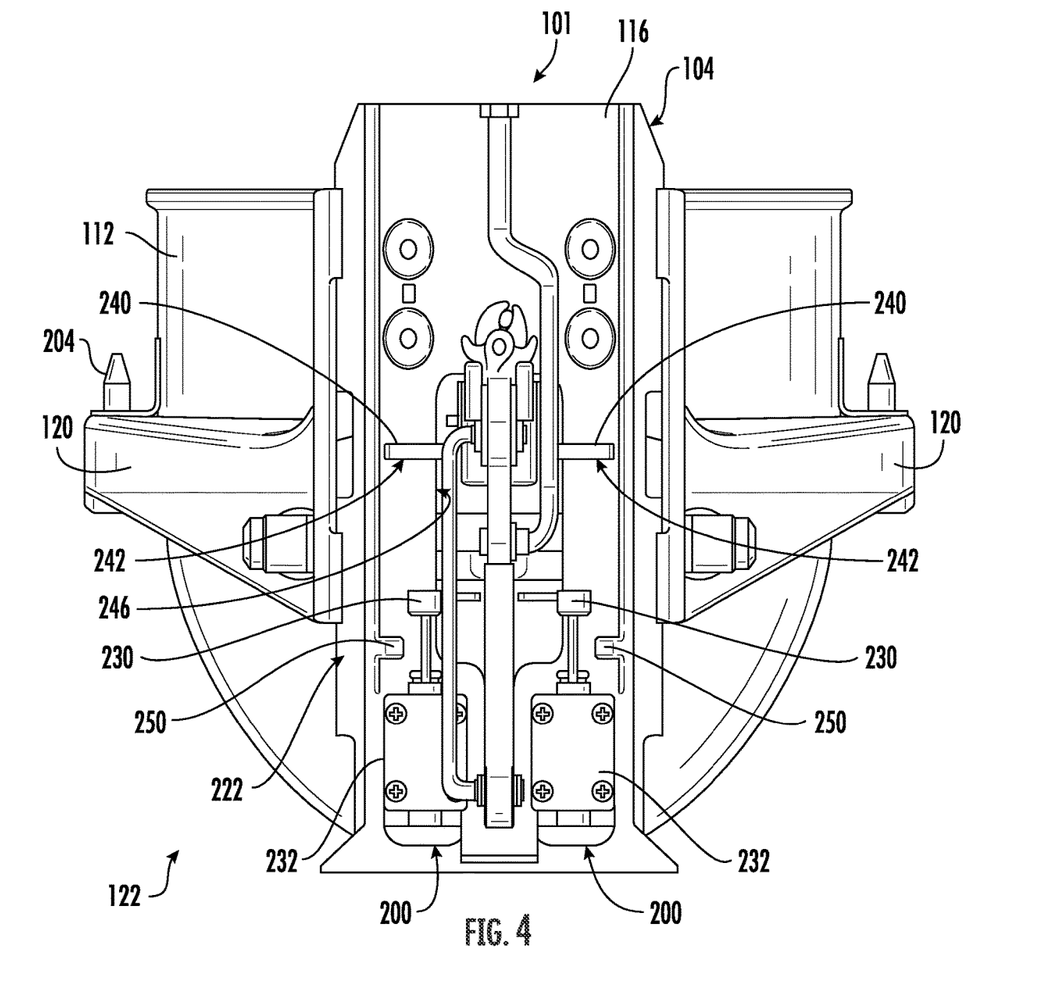
FIG. 4 provides a rear perspective view of a portion of the exemplary stand mixer appliance of FIG. 1 in the raised position.
Figure 5:
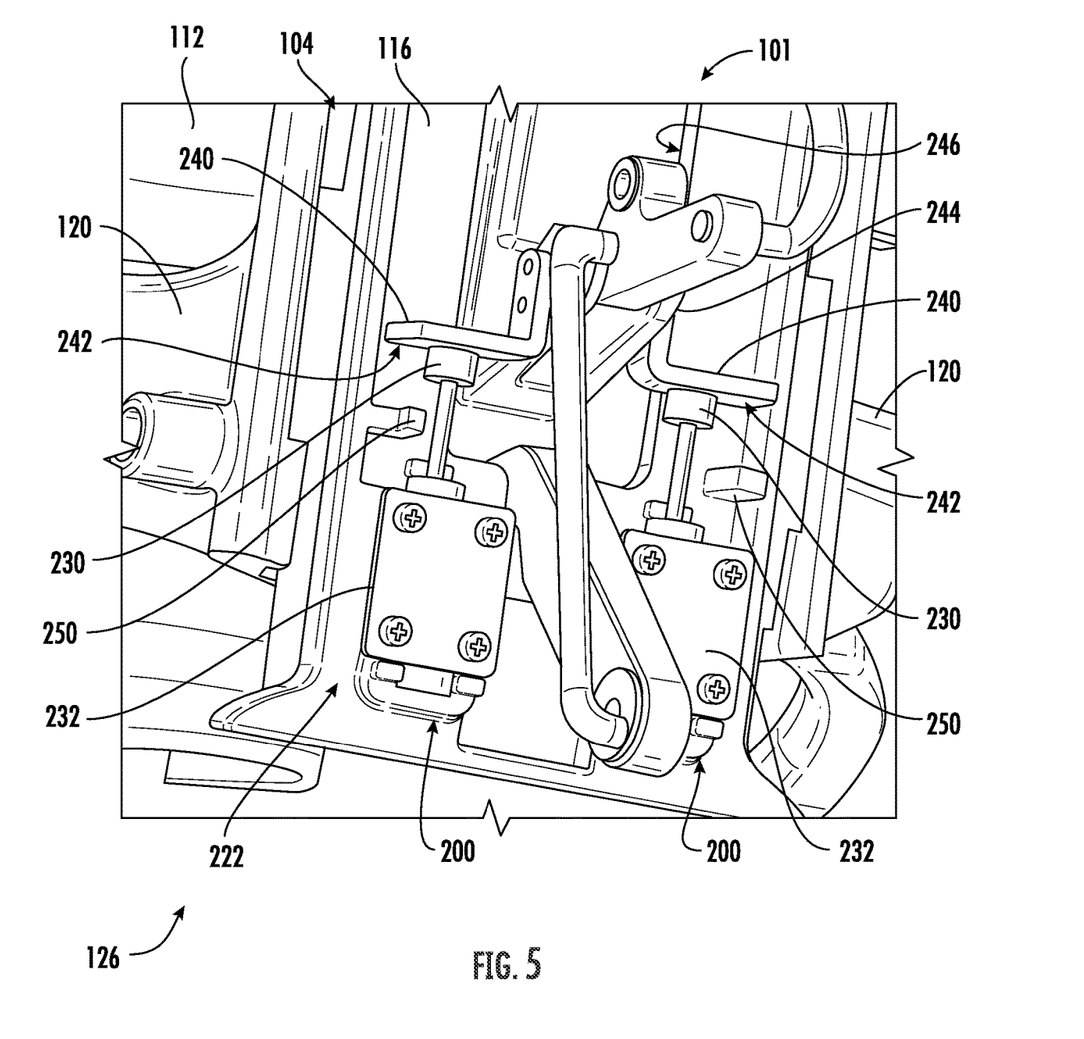
FIG. 5 provides a rear perspective view of the portion of the exemplary stand mixer appliance of FIG. 4 in the mid-movement position.
Figure 6:
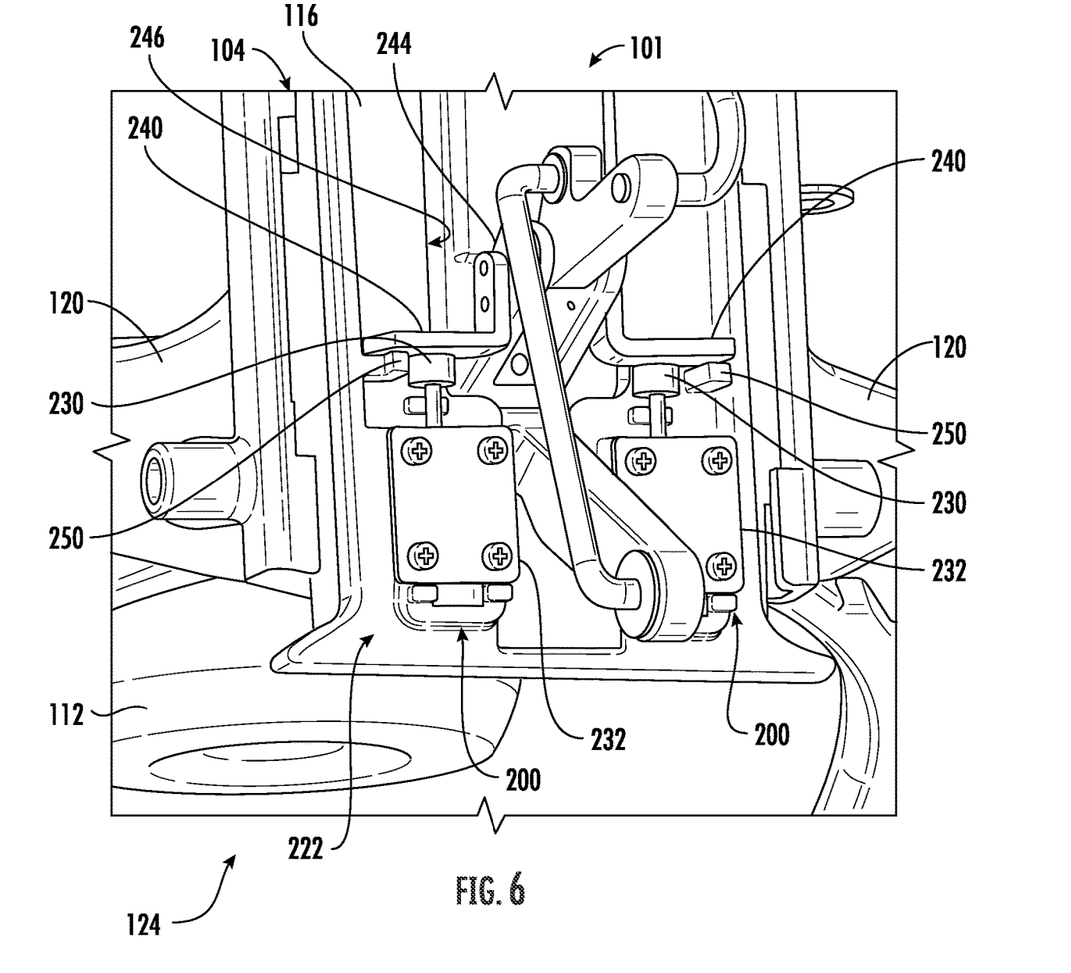
FIG. 6 provides a rear perspective view of the portion of the exemplary stand mixer appliance of FIG. 4 in the lowered position.

Turning to FIGS. 4 through 6, FIG. 4 depicts a rear view of an interior of support frame 101 in the raised position 122. FIG. 5 depicts a rear view of the interior of support frame 101 in the mid-movement position 126. FIG. 6 depicts a rear view of the interior of support frame 101 in the lowered position 124.

As described above, bracket 240 attaches to bowl arm assembly 108. As shown, bracket 240 attaches to a rear portion of bowl arm assembly 108 in transverse direction T, at a position adjacent to the inner surface 222 of support frame 101. In some embodiments, bracket 240 attaches to bowl arm assembly 108 within support frame 101.

Additionally, or alternatively, bowl arm assembly 108 may include a bracket mounting structure 244, with bracket 240 attaching to bracket mounting structure 244 of bowl arm assembly 108. As shown, column rail 116 defines a bowl lift aperture, and bracket mounting structure 244 of bowl arm assembly 108 extends through bowl lift aperture 246 into support frame 101. Bracket 240 mounts to bracket mounting structure 244 on bowl arm assembly 108 inside support frame 101 and adjacent to inner surface 222 of support column 104. Bowl arm assembly 108 extends into support frame 101, with bracket mounting structure 244 extending behind column rail 116 in transverse direction T. Bowl arm assembly 108 also extends in front of column rail 116 in transverse direction T, with bowl support arm 120 and lift arm 206.

As shown in FIGS. 4 through 6, a damper assembly 200 is mounted to support frame 101 and positioned for engaging bracket 240 as it moves toward lowered position 124. In some embodiments, damper assembly 200 is aligned with bracket 240. Damper assembly 200 includes a damper head 230 and a damper body 232. Further, damper head 230 may extend from damper body 232 in the vertical direction V. Damper head 230 is configured to engage a bottom surface 242 of bracket 240. In some embodiments, damper head 230 may further be configured to rest in an extended position.

As shown, damper assembly 200 is mounted to support frame 101. For example, damper assembly 200 attaches at inner surface 222. According to the arrangement, damper assembly 200 is positioned for engaging bowl arm assembly 108 as it moves toward lowered position 124. In some embodiments, damper assembly 200 aligns to connect with bowl arm assembly 108 (e.g., aligns with bracket 240). In this manner, the direction of movement of bowl arm assembly 108 may be parallel to a central axis of damper assembly 200, e.g., when damper assembly 200 is a linear damper. Damper assembly 200 generally connects with bowl arm assembly 108 within support frame 101.

Generally, damper assembly 200 is configured to decrease a speed of movement of the bowl arm assembly 108 for at least a portion of a movement of the bowl arm assembly 108 between the raised position 122 and the lowered position 124. Damper assembly 200 may include at least one of a linear damper, a spring, a torsional damper, a hydraulic damper system, a pneumatic damper system, or an equivalent damper.

During movement of stand mixer 100 between raised position 122 and lowered position 124, bowl arm assembly 108, and mixing bowl 112, if attached to bowl arm assembly 108, lowers in vertical direction V. In some examples, bowl arm assembly 108 is generally configured to slide along column rail 116 during movement between raised position 122 in FIG. 4, through mid-movement position 126 in FIG. 5, and into lowered position 124 in FIG. 6. As shown, bracket 240 is configured to slide along inner surface 222 of column rail 116 between raised position 122 and lowered position 124. In some examples, pivoting of lift arm 206 towards support frame 101 may initiate movement of bowl arm assembly 108 from raised position 122 to lowered position 124.

In some examples, bowl arm assembly 108 is configured to slide unrestricted along column rail 116 during a first portion of movement between the raised position 122 and the lowered position 124, as shown by FIGS. 4 and 5. The first portion of movement may be the portion of movement prior to connecting the bracket 240 to the damper assembly 200 during movement between the raised position 122 (FIG. 4) and the lowered position 124 (FIG. 6).

During use, damper assembly 200 is moveable in vertical direction V to slow vertical movement of bowl arm assembly 108. For instance, damper assembly 200 may slow sliding motion of bowl arm assembly 108 along column rail 116 or slow sliding motion of bracket 240 along inner surface 222. During use, damper assembly 200 begins to slow motion of bowl arm assembly 108 when bracket 240 contacts damper head 230, as shown in FIG. 5. In other words, during movement of bowl arm assembly 108 between raised position 122 and lowered position 124 is a slowdown portion of movement (e.g., as shown by FIGS. 5 and 6). The slowdown portion of movement occurs between raised position 122 and lowered position 124 and occurs upon connection of the damper head 230 to bottom surface 242 of bracket 240. During the slowdown portion of movement, bracket 240 maintains contact with damper assembly 200 causing the bowl arm assembly 108 to slide more slowly along the column rail 116, the movement of the bowl arm assembly 108 along the column rail 116 restricted by the damper assembly 200.

As shown in FIGS. 4 through 6, the bracket 240 may be spaced apart from the damper assembly 200 in the raised position 122 (FIG. 4) and may contact the damper assembly 200 in the lowered position 124 (FIG. 6), the bracket 240 engaging the damper assembly 200 during movement of the bowl arm assembly 108 from the raised position 122 to the lowered position 124 (FIG. 5). In such examples, bowl arm assembly 108 may freefall during an initial period of movement (e.g., movement of the bowl arm assembly 108 between the raised position 122 in FIG. 4 and the mid-movement position 126 in FIG. 5) and may move more slowly during the slowdown portion of movement (e.g., movement of the bowl arm assembly 108 between the mid-movement position 126 in FIG. 5 and the lowered position 124 in FIG. 6).

In some embodiments, bracket 240 may be in contact with damper assembly 200 for at least 50% of the movement distance between the raised position 122 and the lowered position 124, such that bowl arm assembly 108 moves at a restricted rate of movement during contact between the bracket 240 and the damper assembly 200. In some embodiments, bracket 240 may be in contact with damper assembly 200 for between about 50% and about 30% of the movement distance between the raised position 122 and the lowered position 124. In some embodiments, contact with damper assembly 200 for between about 30% and about 10% of the movement distance between the raised position 122 and the lowered position 124.

As shown in FIG. 2, it may be beneficial to restrict movement during the unloading distance 128 of movement between the raised position 122 and the lowered position 124. The unloading distance 128 may be a distance designed to allow a user to remove a hand, fingers, or other item from base 102 prior to being pinched by mixing bowl 112 as it lowers. Advantageously, slowing movement during this final distance may greatly reduce instances of pinching by the bowl arm assembly 108 lowering, or may notify a user that pinching will soon occur while slowing the movement of the bowl arm assembly 108 to allow a user time to remove fingers or another item before the item is pinched. Pinching may occur between the mixing bowl 112 and the base 102 or may occur between bowl arm assembly 108 (e.g., the lift arm 206, as shown in the lowered position 124 in FIG. 2) and base 102, depending on the orientation of different embodiments.

Additionally or alternatively, column rail 116 may further include a mechanical stop 250. Mechanical stop 250 may extend from inner surface 222, e.g., in transverse direction T, away from the outer surface 224. The bracket 240 may rest on the mechanical stop 250 in the lowered position 124, as shown in FIG. 6. Mechanical stop 250 may arrest further movement of the bowl arm assembly 108 past the lowered position 124 in vertical direction V. Advantageously, mechanical stop 250 may serve as an additional safety feature, preventing the bowl arm assembly 108 from further movement toward base 102 in vertical direction V.

In some embodiments, mixing bowl 112 or bowl arm assembly 108 does not touch base 102 in lowered position 124. Slowing movement of bowl arm assembly 108 as it moves from raised position 122 to lowered position 124 may still be desirable for safety or predictability reasons, as pinching may occur even if base 102 does not contact mixing bowl 112 or bowl arm assembly 108.

In alternative embodiments, a portion of bowl arm assembly 108 may touch base 102 in lowered position 124. For example, as shown in FIG. 3, lift arm 206 touches base 102 in lowered position 124.

In some embodiments, bracket 240 may contact damper assembly 200 in the raised position 122 and may continue to contact damper assembly 200 during movement from the raised position 122 to the lowered position 124. In such examples, bracket 240 maintains contact with damper assembly 200 as bowl arm assembly 108 moves between the raised position 122 and the lowered position 124. Such an example may be shown by FIGS. 5 and 6, with an understanding that damper assembly 200 could be longer or shorter depending on the different embodiments. In such examples where the damper assembly 200 and bracket 240 are in contact in both the raised position 122 and the lowered position 124, FIG. 5 would serve as a depiction of the raised position 122, with FIG. 6 remaining a depiction of the lowered position 124. Further, movement of bowl arm assembly 108 along column rail 116 between the raised position 122 and the lowered position 124 would be restricted during the entirety of the movement in such examples.

In additional or alternative embodiments, damper assembly 200 includes two damper assemblies 200. These two damper assemblies 200 may be aligned in lateral direction L along inner surface 222 of column rail 116. According to the arrangement, bracket 240 may include two brackets 240. Each bracket 240 may be attached to bowl arm assembly 108 such that each bracket 240 aligns with a corresponding damper assembly 200 as shown in FIGS. 4 through 6. Each bracket 240 may be configured to contact each corresponding damper assembly 200 as bowl arm assembly 108 moves between raised position 122 and lowered position 124. Different embodiments may have more or fewer pairs of damper assemblies 200 and brackets 240, depending on the needs of the embodiments. In some embodiments, two mechanical stops 250 may align with the two brackets 240. Advantageously, using at least two brackets 240 and at least two damper assemblies 200 aids in distributing the weight of the bowl arm assembly 108 better as the bowl arm assembly 108 moves between the raised position 122 and the lowered position 124.

Embodiments described herein describe methods and systems of lowering the bowl of a countertop mixer safely that may avoid pinching the fingers of the user. A damper actuating bracket may be attached to the bowl arm assembly. The bowl arm assembly may actuate a damper assembly, such as a linear damper, during the descending motion of the bowl from the raised position toward the lowered position to bring the bowl slowly to the lowered position or home position. The lowered position may be useful for loading or unloading the bowl. The raised position may be useful for mixing items within the bowl. In some examples, the bowl arm assembly, including the bowl, if attached, drops under gravity until the bracket, a damper actuator, hits a linear damper cylinder of the damper assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer defining a vertical direction, a lateral direction, and a transverse direction, the stand mixer comprising:
    a support frame;
    a bowl arm assembly slidably mounted to the support frame and being movable between a raised position and a lowered position;
    a damper assembly mounted to the support frame and being positioned for engaging the bowl arm assembly as it moves toward the lowered position; and
    a bracket attached to the bowl arm assembly, wherein the damper assembly is further aligned with the bracket, the bracket configured to contact the damper assembly to initiate a slowdown period of movement of the bowl arm assembly as the bowl arm assembly moves between the raised position and the lowered position.

2. The stand mixer of claim 1, wherein the support frame comprises a base member and a support column extending from the base member, wherein the bowl arm assembly is slidably mounted on the support column.

3. The stand mixer of claim 2, wherein the bowl arm assembly comprises a bowl support arm that is configured for receiving a mixing bowl, the stand mixer further comprising:
    a mixing head mounted proximate a top of the support frame, wherein the bowl support arm is positioned adjacent the mixing head when the bowl arm assembly is in the raised position.

4. The stand mixer of claim 1, wherein the bracket maintains contact with the damper assembly as the bowl arm assembly moves between the raised position and the lowered position.

5. The stand mixer of claim 1, wherein the bracket is spaced apart from the damper assembly in the raised position and contacts the damper assembly in the lowered position, the bracket engaging the damper assembly during movement of the bowl arm assembly from the raised position and to the lowered position.

6. The stand mixer of claim 1, wherein the support frame further comprises a column rail, the bowl arm assembly slidably connected to the column rail and moveable along the column rail in the vertical direction between the raised position and the lowered position.

7. The stand mixer of claim 6, wherein the column rail comprises an inner surface located within the support frame and an outer surface facing opposite the inner surface,
    wherein the damper assembly contacts the bowl arm assembly within the support frame, and
    wherein the bracket connects with the damper assembly at a position adjacent to the inner surface.

8. The stand mixer of claim 7, wherein the column rail further comprises a mechanical stop extending from the inner surface, and
    wherein the bracket rests on the mechanical stop in the lowered position, the mechanical stop arresting further movement of the bowl arm assembly past the lowered position.

9. The stand mixer of claim 7, wherein the bowl arm assembly comprises a bracket mounting structure, the bracket attached to the bracket mounting structure of the bowl arm assembly,
    wherein the column rail defines a bowl lift aperture, the bracket mounting structure of the bowl lift assembly extending through the bowl lift aperture into the support frame, and
    wherein the bracket slides along the inner surface of the column rail between the raised position and the lowered position.

10. The stand mixer of claim 6, wherein the bowl arm assembly is configured to slide unrestricted along the column rail during a first portion of movement between the raised position and the lowered position, the first portion of movement prior to connecting the bracket to the damper assembly during movement between the raised position and the lowered position.

11. The stand mixer of claim 7, wherein the damper assembly comprises two damper assemblies aligned laterally along the inner surface of the column rail, wherein the bracket comprises two brackets, each bracket attached to the bowl arm assembly such that each bracket aligns with a corresponding damper assembly, and
    wherein each bracket configured to contact each corresponding damper assembly to initiate a slowdown movement period of the bowl arm assembly as the bowl arm assembly moves between the raised position and the lowered position.

12. The stand mixer of claim 1, the bowl arm assembly further comprising:
    a bowl support arm configured to removably couple to a mixing bowl; and
    at least one rotating lift arm moveable between the raised position and the lowered position, the at least one rotating lift arm pivotably attached to the bowl support arm and configured to pivot to initiate movement of the bowl arm assembly from the raised position into the lowered position.

13. The stand mixer of claim 2, wherein the stand mixer further comprises a mixing bowl, the mixing bowl removably coupled to the bowl arm assembly and moveable between the raised position and the lowered position with the bowl arm assembly.

14. The stand mixer of claim 13, wherein the mixing bowl rests above the base member in the raised position and in the lowered position, with an unloading distance between the base member in the lowered position.

15. The stand mixer of claim 13, wherein the mixing bowl contacts the base member in the lowered position.

16. The stand mixer of claim 1, wherein the damper assembly is at least one of: a linear damper, a spring, a torsional damper, a hydraulic damper system, or a pneumatic damper system.

17. The stand mixer of claim 1, wherein the damper assembly includes a damper head, the damper head configured to engage a bottom surface of the bracket,
    wherein a slowdown portion of movement between the raised position and the lowered position occurs upon connection of the damper head to the bottom surface of the bracket.

18. A stand mixer defining a vertical direction, a lateral direction, and a transverse direction, the stand mixer comprising:
- a support frame;
- a bowl arm assembly slidably mounted to the support frame and being movable between a raised position and a lowered position;
- a bracket attached to the bowl arm assembly; and
- a damper assembly comprising a damper, the damper mounted to the support frame and being positioned for engaging the bracket as it moves toward the lowered position.

19. The stand mixer of claim 18, wherein the support frame further comprises a column rail, the bowl arm assembly slidably connected to the column rail and moveable along the column rail in the vertical direction between the raised position and the lowered position,
- wherein the column rail further comprises a mechanical stop extending from an inner surface of the column rail, and
- wherein the bracket rests on the mechanical stop in the lowered position, the mechanical stop configured to arrest movement of the bowl arm assembly past the lowered position.

20. A stand mixer defining a vertical direction, a lateral direction, and a transverse direction, the stand mixer comprising:
- a support frame;
- a bowl arm assembly slidably mounted to the support frame and being movable between a raised position and a lowered position, the bowl arm assembly comprising a bowl support arm configured to removably couple to a mixing bowl and at least one rotating lift arm moveable between the raised position and the lowered position, the at least one rotating lift arm pivotably attached to the bowl support arm and configured to pivot to initiate movement of the bowl arm assembly from the raised position into the lowered position; and
- a damper assembly mounted to the support frame and being positioned for engaging the bowl arm assembly as it moves toward the lowered position.

* * * * *